Patented Nov. 7, 1933

1,934,383

UNITED STATES PATENT OFFICE 1,934,383

PROCESS OF MAKING PERMEABLE CERAMIC PRODUCTS

William L. Stafford, Somerville, N. J., assignor to Johns-Manville Corporation, New York, N. Y., a corporation of New York No Drawing. Application May 21, 1931
Serial No. 539,138

15 Claims. (Cl. 25—156)

The present invention relates to the manufacture of porous products by the removal of admixed solid particles and particularly to the manufacture of porous ceramic articles by the separation by volatilization of naphthalene or similar material added to the raw ceramic mix.

The invention is particularly directed to the provision of a porous or permeable tile having numerous intercommunicating pores which open to the surface of the tile. A sponge-like structure of this character adapts the tile especially well for use for acoustical purposes.

The manufacture of porous ceramic articles by mixing naphthalene with the raw ceramic mix, molding the mixture, and thereafter producing voids in the molded article by subliming or evaporating the naphthalene therefrom, is described in German Patent #23,947 to Stein.

It has been found however, that the process of this patent is not satisfactory due to the fact that during the heating stage for the removal of the naphthalene by evaporation the molded product tends to become very plastic and deforms under its own weight due to the fluid character of the melted naphthalene. Slow removal of the naphthalene by sublimation alone, an alternative procedure disclosed by this patent is also objectionable due to the very long period of time required. These disadvantages are especially great in the manufacture of a product having relatively great permeability such as is requisite in an acoustical tile due to the necessity of employing large amounts of naphthalene.

The principal object of this invention is the provision of a method and article whereby these disadvantages may be obviated. It has been discovered that this object may be attained by incorporating a relatively small amount of cementitious material in the raw mix together with the naphthalene or similar material. The cementitious material or bonding agent thus used must have characteristics which adapt it to set or bind and impart sufficient strength to the molded mixture to prevent deformation during the heating stage wherein the naphthalene or equivalent material is melted and volatilized. Calcined gypsum and various other varieties of hydraulic setting cements have been ascertained to have the requisite properties.

For the purpose of example, and merely to illustrate one way of practicing the invention, in the preferred process for the manufacture of a porous, permeable tile for acoustical correction purposes, the base materials and process may be as follows:

The argillaceous body material or clay selected should be fairly plastic and preferably burn to a white or buff color, also various color stains may be incorporated if desired. The dry modulus of rupture of such clay should be not less than 100 lbs. per sq. in., and the modulus of rupture after firing at say 2250° F. should be above 2000 lbs. per sq. in. The pyrometric cone equivalent should be above cone 20 (2775° F.). The linear fired shrinkage at 2250° F. should preferably be lower than 20%. This type clay or a blend of clays having such properties are well known in the ceramic art, as for example plastic fireclays, but it will be appreciated that plastic high shrinking clays as ball clays can be used if grog is added, that more refractory clays of higher maturing temperature such as kaolins can be used if the firing temperature is proportionally raised, or that less refractory clays as common brick clays may be used if the firing temperature is proportionately reduced.

The naphthalene should preferably be in the shape of rounded particles which pass through an 18 mesh screen, altho angular particles of flaky naphthalene crystals may alternately be used of a size best suited to secure certain attractive architectural effects, as for example, combinations of large irregular flakes with small round pellets or all angular grains of less than 8 mesh prepared by grinding and screening caked naphthalene. The rounded naphthalene of less than 18 mesh screen size may readily be secured by melting the crystals recovered from the drying operation, and atomizing the resulting liquid by hitting a stream of the molten material with compressed air, and blowing it into an enclosed chamber where it drops in the form of minute spheres. The naphthalene content should not be over 75% by weight of the total batch as more than this gives excessive weakness. Any lesser quantity may be used dependent upon the porosity desired.

The cementitious material may be calcined gypsum, Incor cement, lumnite cement or Portland cement, or any form of hydraulic setting agent with similar properties. Calcined gypsum is preferred because of its lower cost altho quick setting Portland (Incor) is an entirely satisfactory substitute otherwise. Other forms of bonding or reenforcing materials such as bentonite may be utilized to produce ceramic mixes which will not deform during the heating step incident to the removal of the naphthalene. The amount of such material may vary from 5 to 30% of the weight of clay. It may be generally stated that the quantity of cementitious material employed should be kept as low as possible and should represent only a minor proportion of the product since an excessive amount thereof renders satisfactory burning of the product difficult.

With 18% water content, a mix of the following formula may be dry pressed into tile shape under a pressure of 200–500 lbs. per sq. in. (300 lbs. pressure is quite suitable).

| | By weight |
|---|---|
| Clay (as above) | 28 |
| Naphthalene (thru 18 mesh) | 65 |
| Calcined gypsum | 7 |

Other ways of forming the shape will occur to one skilled in the art, as for example by extruding from an auger machine, slop-molding and repressing, or casting into molds. The formed tile may be handled directly into a drier operating at 212° F. or any temperature in excess of 176° F. but below the spontaneous combustion point of naphthalene (above 425° F., vaporizing point). The naphthalene and water vapor are removed by fan from the drying chamber into a cool chamber and the naphthalene condenses out and is thus recovered for reuse.

The dry tile may then be set directly in a suitable kiln for firing to a temperature of 2300° F. This temperature is satisfactory for the preferred composition, and gives 9% linear shrinkage. After cooling, a face may be ground down to remove any surface skin effect and to expose more fully the interconnecting pores. It is apparent that interconnecting pores are a corollary of the process, as the removal of the naphthalene in fluid and vapor state necessarily creates intercommunication. This may be enhanced by various means such as by using rounded particles of naphthalene of a size giving maximum contiguity, and by firing to certain temperatures which experiment shows gives maxium break down of the clay film between voids.

Using the above described composition and procedure, buff colored acoustical tile have been produced in quantity with a density of 26 lbs. per cu. ft.; a modulus of rupture of 75 to 100 lbs. per sq. inch; a porosity of 85%; a specific permeability of 0.98 c. c. per sec. per $cm^2$ per cm. thick per cm. $H_2O$ pressure, and a sound absorption efficiency at 256 cycles frequency of 48%.

It is apparent that other porous shapes may be made by the same process, as for example, insulating brick or block. The shapes may be easily sawed or nailed, and applied to exterior wall surfaces when employed for acoustical use with plaster or various adhesives. Minor variations in the amount, shape and size of naphthalene, and its relative distribution in the piece, in the kind of clays or ceramic body compositions, in the amount and kind of cementitious material used, and in the firing temperature employed, are all possible so that close control of the final properties is possible in order to meet any particular set of conditions for a porous ceramic article.

Various materials may be substituted for naphthalene in the practice of my invention such as anthracene or even inorganic material. The material used for this purpose should preferably be liquefiable and readily volatilized and also water-insoluble in order that it will not dissolve in the raw mix. In some instances the admixed solid may be removed by merely melting it and draining it from the molded mixture. Under this condition the cementitious material functions to prevent deformation during the heating step as before. Substances such as paraffin or even naphthalene lend themselves to treatment by this method. As indicated any amount of the volatile solid may be employed but for acoustical purposes the quantity added should be sufficient to impart sufficient permeability so that the final product will absorb at least 35% of the sound having a frequency of 500 cycles impinging on its exposed surface.

What I claim is:

1. A process of manufacturing porous structural shapes such as bricks, slabs and the like which comprises admixing a body material having relatively small bonding strength, a volatile solid, and a cementitious material capable of hardening at a relatively low temperature and imparting sufficient strength to the admixture to prevent substantial disintegration or deformation thereof during the subsequent heating stage, forming the mixture into suitable shapes, and heating the shaped mass to volatilize the volatile solid.

2. A process of manufacturing porous structural shapes such as bricks, slabs and the like which comprises admixing a body material having relatively small bonding strength at low temperatures but capable of developing a strong ceramic bond at elevated temperatures, a volatile solid, and a cementitious material capable of hardening at a relatively low temperature and imparting sufficient strength to the admixture to prevent substantial disintegration or deformation thereof during the subsequent heating stage, forming the mixture into suitable shapes, heating the shaped mass to volatilize the volatile solid, and then further heating the porous mass until the body material is ceramically bonded.

3. A proces of manufacturing porous structural shapes such as bricks, slabs and the like which comprises admixing an argillaceous body material having relatively small bonding strength a volatile solid and a cementitious material capable of hardening at a relatively low temperature and imparting sufficient strength to the admixture to prevent substantial disintegration or deformation thereof during the subsequent heating stage, forming the mixture into suitable shapes, and heating the shaped mass to volatilize the volatile solid and then further heating the porous mass to develop a ceramic bond in the argillaceous body material.

4. A process of manufacturing porous structural shapes such as bricks, slabs and the like which comprises admixing a plastic clay having a relatively low drying shrinkage, a volatile solid, and a cementitious material capable of hardening at a relatively low temperature and imparting sufficient strength to the admixture to prevent substantial disintegration or deformation thereof during the subsequent heating stage, forming the mixture into suitable shapes, and heating the shaped mass to volatilize the volatile solid and then further heating the resultant porous mass to develop a ceramic bond in the plastic clay material.

5. A process of manufacturing porous structural shapes such as bricks, slabs and the like which comprises admixing a body material having relatively small bonding strength, a liquefiable volatile solid and a cementitious material capable of hardening at a relatively low temperature and imparting sufficient strength to the admixture to prevent substantial disintegration or deformation thereof during the subsequent heating state, forming the mixture into suitable shapes, and heating the shaped mass to a temperature sufficiently high to melt and volatilize the volatile solid.

6. A process of manufacturing porous structural shapes such as bricks, slabs and the like which comprises admixing a body material having relatively small bonding strength, a water insoluble volatile solid, and a cementitious material capable of hardening at a relatively low temperature and imparting sufficient strength to the admixture to prevent substantial disintegration or deformation thereof during the subsequent heating state, forming the mixture into suitable shapes, and heating the shaped mass at a temperature sufficiently high to melt and volatilize the volatile solid.

7. A process of manufacturing porous structural shapes such as bricks, slabs and the like which comprises admixing a body material having relatively small bonding strength at low temperatures, naphthalene and a cementitious material capable of hardening at a relatively low temperature and imparting sufficient strength to the admixture to prevent substantial disintegration or deformation thereof during the subsequent heating stage, forming the mixture into suitable shapes, and heating the shaped mass to volatilize the naphthalene.

8. A process of manufacturing porous structural shapes such as bricks, slabs and the like which comprises admixing a body material having relatively small bonding strength, a solid having a low melting point, and a hydraulic cement material capable of setting and hardening at substantially atmospheric temperature and imparting sufficient strength to the admixture to prevent substantial disintegration or deformation thereof during the subsequent heating stage, forming the mixture into suitable shapes, and heating the shaped mass to melt the solid having the low melting point and separating the liquid from the shaped mixture.

9. A process of manufacturing porous molded shapes of light weight porous ceramic material which comprises forming a plastic or fluid mass of clay, a volatile readily liquefiable solid, and a cementitious material, forming the mass into the desired shapes, permitting the cementitious material to set and impart sufficient strength to the shaped mass to prevent substantial deformation thereof during the subsequent heating stage wherein the said volatile solid is liquefied, and then heating the shaped mass to a sufficient temperature to liquefy the volatile material and separate it from the mass by volatilization, further heating the porous mass thus produced to impart a ceramic bond thereto.

10. A process of manufacturing porous molded shapes of light weight porous ceramic material which comprises forming a plastic or fluid mass of clay, naphthalene and a cementitious material, forming the mass into the desired shapes, permitting the cementitious material to set and impart sufficient strength to the shaped mass to prevent substantial deformation thereof during the subsequent heating stage wherein the said volatile solid is liquefied and then heating the shaped mass to a sufficient temperature to liquefy the volatile material and separate it from the mass by volatilization, further heating the porous mass thus produced to impart a ceramic bond thereto.

11. A process of manufacturing porous molded shapes of light weight porous ceramic material which comprises forming a plastic or fluid mass of clay, a volatile liquefiable solid and a hydraulic cement, forming the mass into the desired shapes, permitting the cementitious material to set and impart sufficient strength to the shaped mass to prevent substantial deformation thereof during the subsequent heating stage wherein the said volatile solid is liquefied, and then heating the shaped mass to a sufficient temperature to liquefy the volatile material and separate it from the mass by volatilization, further heating the porous mass thus produced to impart a ceramic bond thereto.

12. A process of manufacturing porous molded shapes of light weight porous ceramic material which comprises forming a plastic or fluid mass of clay, a volatile liquefiable solid and a quick-setting hydraulic cement, forming the mass into the desired shapes, permitting the cementitious material to set and impart sufficient strength to the shaped mass to prevent substantial deformation thereof during the subsequent heating stage wherein the said volatile solid is liquefied and then heating the shaped mass to a sufficient temperature to liquefy the volatile material and separate it from the mass by volatilization, further heating the porous mass thus produced to impart a ceramic bond thereto.

13. A shaped mass comprising a body material having little bonding strength, a relatively small amount of cementitious material intermixed with the body material and imparting sufficient strength to the mass to maintain its structure, said mass comprising a multiplicity of pores constituted by voids left in the mass by removal of solid matter initially admixed therewith.

14. A shaped mass comprising a ceramic body material having little bonding strength, a relatively small amount of cementitious material intermixed with the body material and imparting sufficient strength to the mass to maintain its structure, said mass comprising a multiplicity of pores constituted by voids left in the mass by removal of solid matter initially admixed therewith.

15. A shaped mass comprising a body material having little bonding strength, a relatively small amount of cementitious material intermixed with the body material and imparting sufficient strength to the mass to maintain its structure, said mass comprising a multiplicity of pores constituted by voids left in the mass by liquefaction and volatilization of a volatile liquefiable solid material initially admixed therewith.

WILLIAM L. STAFFORD.